March 2, 1954 R. L. ANDERSON 2,670,631
GRAIN TANK UNLOADER
Filed Dec. 30, 1950 2 Sheets-Sheet 1
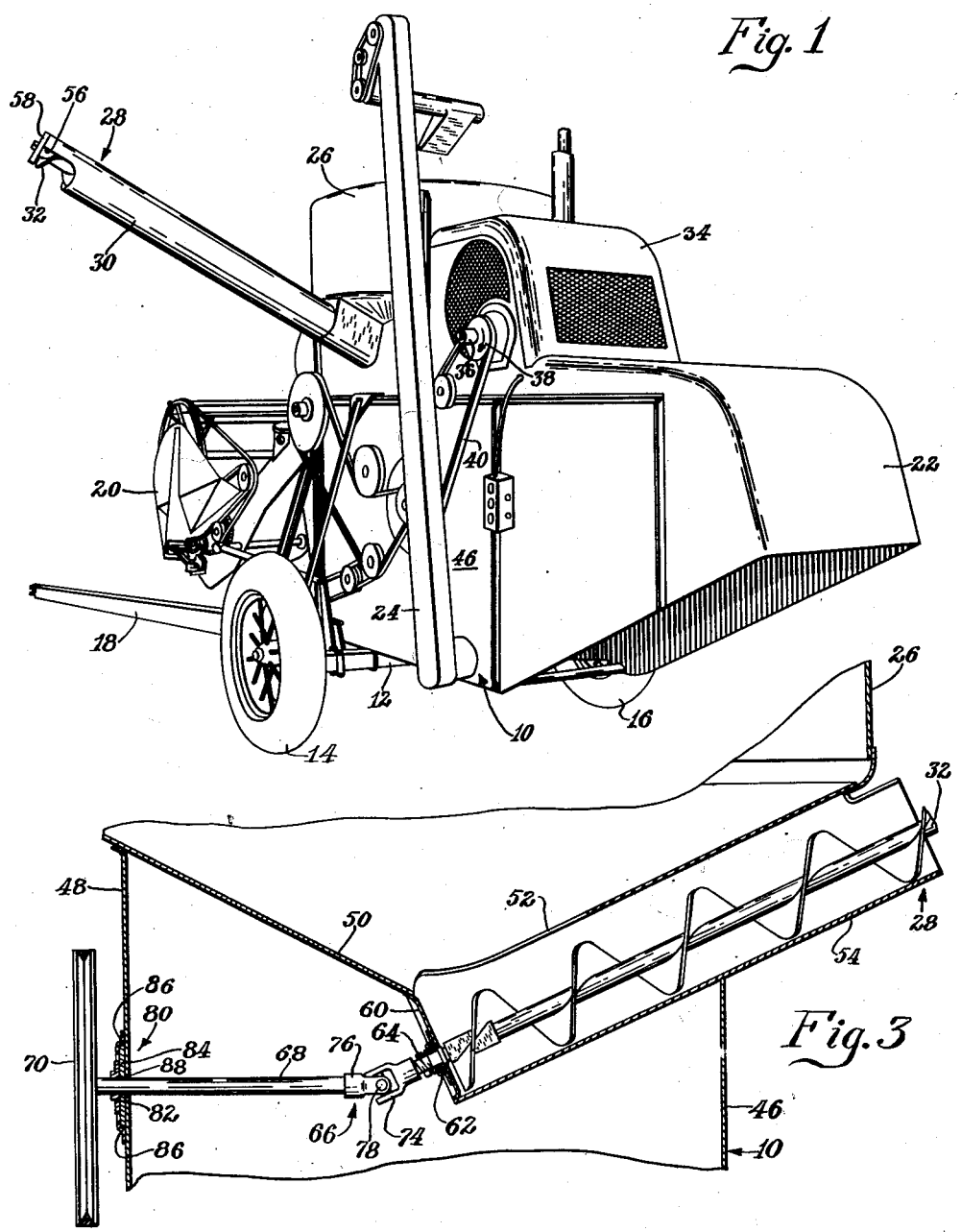
INVENTOR.
R. L. Anderson
Attorneys March 2, 1954  R. L. ANDERSON  2,670,631
GRAIN TANK UNLOADER
Filed Dec. 30, 1950  2 Sheets-Sheet 2
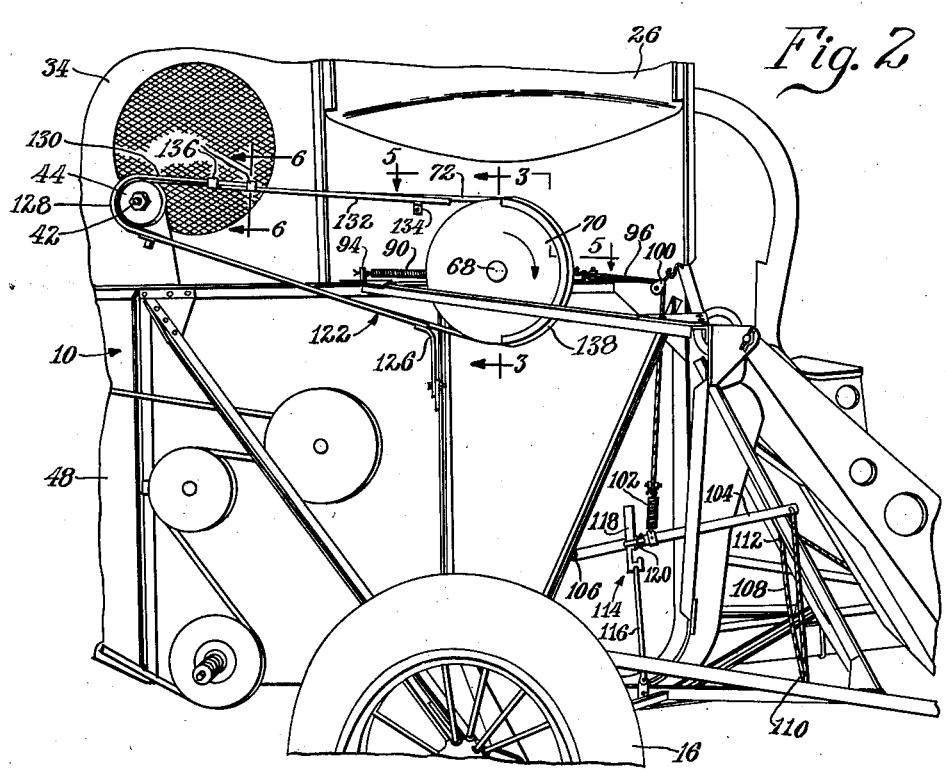
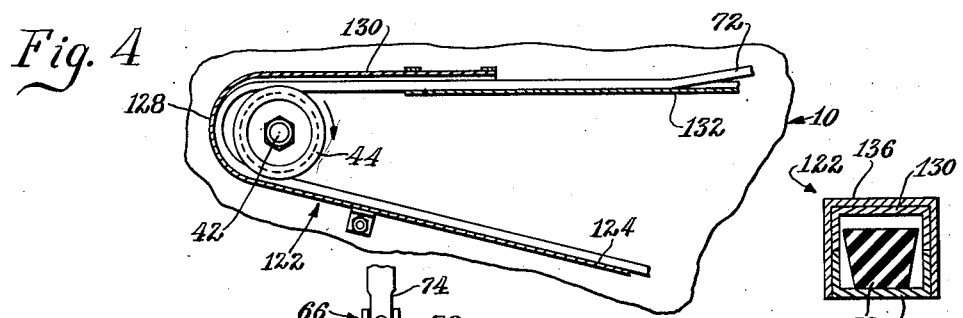
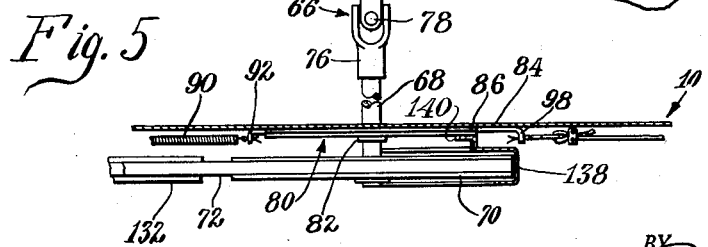
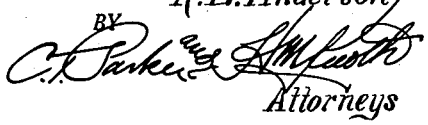
INVENTOR.
R. L. Anderson
BY
Attorneys Patented Mar. 2, 1954

2,670,631

UNITED STATES PATENT OFFICE 2,670,631

GRAIN TANK UNLOADER

Ralph L. Anderson, East Moline, Ill., assignor to Deere & Company, Moline, Ill., a corporation of Illinois Application December 30, 1950, Serial No. 203,671

5 Claims. (Cl. 74—242.15)

This invention relates to material-handling apparatus and more particularly to such apparatus as embodied in a tank unloader for a harvester-thresher or combine.

A typical machine of the character referred to comprises essentially a mobile frame having means for harvesting and threshing grain, the threshed grain being delivered by a suitable elevator or the like to a grain tank of sufficient capacity to accumulate threshed grain in a sufficient quantity so that the tank need be unloaded only at relatively widely spaced intervals. Unloading of the tank is accomplished by either gravity or some form of mechanical conveyor, either of which means is adapted to deliver the grain from the tank to a wheeled vehicle drawn alongside the combine at the time when the tank is to be unloaded.

In the case of the mechanical conveyor for unloading the grain tank, it is desired that this conveyor be operated only when the tank is being unloaded. For that purpose, some form of disconnectible driving means must be provided between the conveyor and the drive or other moving part of the combine. It is also desired that the control for the disconnectible means be easily operated and readily available to the operator of the combine or the combine and tractor unit.

According to the present invention, an improved and simplified form of conveyor and drive and control mechanism therefor is provided. It is an important object of the invention to utilize a drive having a pair of spaced-apart shafts, each of which is provided with a sheave, and about which sheaves a belt is trained for transmitting drive from one sheave to the other. One of the shafts is arranged for movement relative to the other to effect selectively tightening or loosening of the belt. It is an object of the invention to provide improved control means for shifting the movable shaft and sheave for the purposes set forth, thereby providing a selectively connectible or disconnectible drive for the tank unloader. It is a further important object of the invention to utilize an articulate driving connection between the shiftable shaft and the conveyor shaft, which connection takes care of the angularity between the shafts and also serves as a pivot for mounting one end of the shiftable shaft in a manner whereby such shaft may be moved relative to the other shaft. It is likewise an object of the invention to provide belt-retaining means for retaining the general position of the belt when loosened, so that the belt does not become completely displaced from its driving position, but becomes only loosened relative to one of the sheaves so that the driving sheave may continue to operate without transmitting power to the driven sheave.

The foregoing and other important objects and desirable features inherent in and encompassed by the invention will become apparent from the following detailed description and accompanying sheets of drawings in which Figure 1 is a three-quarter perspective view taken from the left side and the rear of a combine, showing the relationship of the grain tank and tank-unloading auger to the remainder of the combine structure;

Figure 2 is a fragmentary perspective view, on a somewhat enlarged scale, showing the right-hand forward portion of the combine and illustrating particularly the drive between the main source of power and the grain tank unloader;

Figure 3 is a fragmentary enlarged sectional view taken substantially along the line 3—3 of Figure 2;

Figure 4 is an enlarged fragmentary sectional view showing a rear portion of the belt-retaining means;

Figure 5 is a fragmentary sectional view taken substantially along the line 5—5 of Figure 2; and Figure 6 is an enlarged transverse sectional view taken substantially along the line 6—6 of Figure 2.

A general idea of the basic structure of the combine chosen for the purposes of illustration may be had from Figure 1. It is shown here that the combine comprises a main body or housing 10 carried on a transverse axle 12 and a pair of laterally spaced wheels 14 and 16. The body 10 and axle 12 comprise part of a frame to which is connected the rear end of a forwardly extending draft tongue 18, which tongue provides means for connecting the combine to a tractor or other source of draft power.

A harvesting platform 20, which may be of any conventional construction, is carried by the combine ahead of the body 10 and includes means for harvesting grain and for feeding the grain to threshing mechanism (not shown) within the body or housing 10. The grain is ultimately threshed and separated, the straw being discharged upon the ground through a rear body extension or hood 22 and the threshed grain being carried by a substantially vertical elevator 24 for discharge into a grain tank 26 here shown as being of cylindrical construction and as being carried at an upper portion of the combine body 10.

The grain tank 26 is unloaded at intervals by means of a mechanical conveyor designated generally by the numeral 28. This conveyor is here shown as comprising a tubular conveyor housing 30 within which is carried a rotatable auger conveyor 32, the details of which will be set forth below. Power for operating the components of the combine, as well as those of the grain tank conveyor 28, is derived from an internal combustion engine (not shown) contained within an enclosure 34 just rearwardly of the grain tank 26. In the present case, the engine is arranged with its crankshaft transverse to the body 10. The rear end of the crankshaft is visible at 36 in Figure 1 and carries a sheave 38 for transmitting power through a belt 40 to various moving parts of the combine, which parts are not important to the present disclosure.

The forward end of the crankshaft, or a suitable crankshaft extension, is visible at 42 in Figure 2. As far as the present disclosure is concerned, the shaft or shaft extension 42 may be considered the primary source of power and will hereinafter be referred to as the driving shaft. This shaft has keyed thereto a sheave 44 for effecting the transmission of power to the grain tank unloading auger 32.

The combine body 10 comprises a pair of laterally spaced-apart upright walls 46 and 48 (Figure 3) and the grain tank 26 has a bottom 50 in the form of an inverted cone having a substantially central discharge opening 52. The unloading conveyor 28 operates to deliver grain outwardly and upwardly from the bottom of the grain tank 26. As previously stated, the outer portion of the unloader 28 comprises the tubular housing 30. This housing is joined at its inner end to a coaxial tubular housing portion 54 appropriately mounted beneath the bottom 50 of the grain tank and communicating with the grain tank through the discharge opening 52. The auger 32 extends from the inner end of the tubular housing 30—54 to the outer end thereof. As shown in Figure 1, the outer end of the housing 30 is cut out at 56 so that grain carried by the auger may be discharged downwardly into a vehicle or other suitable receptacle. An end wall 58 at the outer end of the tubular housing 30 provides a bearing for the outer end of the auger 32.

The auger housing portion 50 below the grain tank 26 has an inner end wall 60 provided with a suitable antifriction bearing 62 for journaling the inner end of the auger, the auger including, as is typical, a central auger shaft 64.

The end wall 60 of the conveyor 28 is substantially centrally disposed between the body side walls 46 and 48 and the shaft 64 is external to the conveyor at this location but is still contained within the body side walls 46 and 48. The shaft 64 at this point has an articulate driving connection 66 with a relatively short shaft 68 that projects to the right and outwardly through the right-hand side wall 48 of the combine body. The outer end of this shaft has keyed thereto a relatively large sheave 70 that is substantially coplanar with the sheave 44 on the driving shaft 42. An endless flexible belt, preferably a V-belt 72, is trained about the sheaves 44 and 70. The auger shaft 64 comprises a driven shaft and the shaft 68 comprises a third shaft between the driving shaft 42 and the driven shaft. Other arrangements could be utilized and other terminology employed, but, for the purposes of clarity, the designation just referred to will be applied hereinafter.

The articulate connection at 66 preferably comprises a pair of universal joint yokes 74 and 76 connected respectively to the shafts 64 and 68 and interconnected at 78. Because of the angular relationship between the shafts 64 and 68, the two are not coaxial, although they may be considered extensions of one another. These two shafts have their axes lying in a common plane which is parallel to the plane of the axis of the driving shaft 42. The right-hand side wall 48 of the combine body 10 includes supporting means, designated generally by the numeral 80, for carrying the outer end of the third shaft 68.

The means 80 preferably includes a bearing 82 for journaling the shaft 68. This bearing is carried in a guide in the form of an elongated plate 84 which is in turn carried in upper and lower guideways 86 secured to and running lengthwise of the body side wall 48. Thus, the outer end portion of the third shaft 68 is carried for shifting or sliding movement relative to the fixed-axis driving shaft 42. The body side wall 48 is provided with an elongated slot 88 to accommodate this movement.

The length of the slot 88 will determine the amount of fore-and-aft shiftability of the outer end of the shaft 68. It will be understood, of course, that the articulate connection at 66 serves as an inner mounting for the inner or left-hand end of the shaft 68, the pivot at 78 in the universal joint providing a pivot about which the shaft may have movement. The rearward position of the shaft 68 is normally resiliently maintained by a relatively light tension spring 90 connected to a hooked rear end 92 of the plate 84 and anchored to a bracket 94 secured to the outside of the body side wall 48. The shaft 68 may be shifted forwardly by means of forcetransmitting mechanism or control means including a first cable 96 connected at one end to a hooked forward portion 98 of the plate 84, trained about a pulley 100 and connected at its other end by means of a relatively strong tension spring 102 to a control lever 104.

This lever is pivoted at 106 on a forward portion of the body side wall 48 for vertical movement. The free end of the lever is connected to one end of an actuating cable or rope 108. This cable extends downwardly and is trained about a pulley 110, then extends upwardly and is trained about a second pulley 112, and then extends forwardly for operation by remote control by an operator on the tractor (not shown) utilized to draw the combine. These details are unimportant but are referred to only for the purposes of setting forth one means for controlling the shifting movement of the shaft 68 and sheave 70.

The rear or release position of the shaft 68 and sheave 70 is shown in Figure 2. When the cable or rope 108 is pulled, a downward force is exerted on the free end of the lever 104, which acts through the spring 102 and cable 96 to move the sheave and shaft forwardly against the relatively light spring 90. The forward position of the sheave and shaft is maintained by releasable means designated generally by the numeral 114. The means shown is only representative of many forms of latch means that could be utilized and, accordingly, this means will not be described in detail. It is deemed sufficient to state that the means comprises an upright rod 116 having at its upper end a notched latch plate 118. The lever 104 carries intermediate its ends a rotatable star wheel 120 selectively cooperative with the notched plate 118 for alternately holding and releasing the lever 104. Tension on the belt 72 can be varied by adjustment of the spring 192.

When the shaft 68 and sheave 70 are in released or retracted position as influenced by the light tension spring 90, the belt 72 will, of course, be loose between the sheaves 44 and 70. Consequently, the driving sheave 44 will transmit no power to the driven sheave 70. When the lever 104 is moved downwardly and retained by the latch or releasable means 114, the belt will be tightened and the transmission of power will be effected.

In order that the belt 72 does not escape completely from its relationship between the sheaves 44 and 70, there is provided belt-retaining means designated generally by the numeral 122. This means comprises preferably a lower, elongated channel 124 rigidly mounted at its forward end by a bracket 126 to the body side wall 48. The channel extends rearwardly and closely below the driving sheave 44, and then curves rearwardly and upwardly in eccentric relationship to the sheave 44, as at 128 (Figure 4). Because of its curving about the zone of the sheave 44, the channel 124 becomes inverted and extends forwardly as a short extension 130.

Another part of the belt-retaining means 122 comprises an upper channel 132 which opens upwardly beneath the upper run of the belt 72. This channel is supported at its forward end on a bracket 134 secured to the right side of the body 10 and is supported at its other end by a pair of inverted U-shaped clips 136 which embrace the extension 130 of the lower channel and which preferably have a tight frictional fit with the side portions of both channels, so that the parts may be easily separated to permit removal of the belt. The channels, as best shown in Figure 6, form in this zone a tunnel through which the belt 72 travels.

Figure 4 shows the relationship between the belt-retaining means 122 and the belt 72 when the sheave 70 and shaft 68 are shifted rearwardly or toward the driving shaft 42. The belt becomes loose and is prevented from sagging by its own weight because of the channel portions 124 and 132. An arcuate shield 138 about one half of the sheave 70 prevents looping of the belt at the sheave 70. This causes the belt to loop out about the sheave 44, thus effecting a temporary disconnection between the sheave and the belt and therefore stopping the transmission of power to the sheave 70. The arcuate or curved portion 128 of the means 122 serves to prevent the looped portion of the belt from escaping completely from a position in which it can be restored to operative connection with the sheave 44. The shield 138 can be mounted at 140 on the sliding plate 84.

It will be apparent from the foregoing that the drive for the grain tank unloader is relatively simple in construction, easy to operate and will require little, if any, maintenance. Other features and advantages not specifically enumerated herein will undoubtedly occur to those versed in the art, as likewise will numerous modifications and alterations in the preferred embodiment of the invention illustrated, all of which may be achieved without departing from the spirit and scope of the invention as defined in the appended claims.

What is claimed is:

1. Driving mechanism, comprising: support means; first and second rotary shafts spaced apart generally horizontally on the support; means mounting the shafts on the support and including provision for movement of one shaft toward and away from the other; first and second sheaves respectively fixed to the shafts; an endless belt trained about the sheaves and adapted to be respectively loosened and tightened when the one shaft is shifted toward and away from the other; upper and lower means on the support engageable respectively between upper and lower runs of the belt to prevent sagging of the belt when loosened, each of said upper and lower means including an elongated straight channel extending between the sheaves and opening upwardly to respectively receive the upper and lower belt runs, and the lower channel including an extension passing upwardly about and loosely embracing one of the sheaves and disposed above and joined to the upper channel, said extension at its junction with the upper channel being inverted to form with said upper channel a tunnel through which the upper run of the belt travels.

2. In combination: supporting structure; a first shaft journaled on the supporting structure for rotation about a fixed axis and having a sheave keyed thereto; a second shaft having first and second opposite ends and including a sheave keyed to its first end substantially in the plane of the first shaft sheave; a third shaft providing substantially a continuation of the second shaft and having one end proximate to the second end of said second shaft; means journaling the third shaft on the supporting structure for rotation about a fixed axis; flexible coupling means interconnecting said proximate ends of the second and third shafts and including a pivot on an axis transverse to the axis of rotation of the third shaft and providing a center about which the first end of the second shaft may swing in an arc toward and away from the first shaft sheave between a first position in which the sheaves are a certain distance apart and a second position in which the sheaves are a lesser distance apart; guide means carrying the first end of the second shaft on the supporting structure for movement between said two positions; an endless drive belt trained about and normally tight to establish drive between the sheaves when the second shaft sheave is in its first position and loose when the second shaft is moved to its second position so as to interrupt said drive; and control means connected between the supporting structure and the second shaft for selectively swinging the second shaft between its two positions.

3. The invention defined in claim 2, further characterized in that: the control means includes yieldable means between the supporting structure and the second shaft normally effective to bias the second shaft to its second position; means for moving the second shaft and sheave against the yielding means in a belt-tightening direction to said first position; and releasable means for holding the second shaft and sheave in said first position.

4. The invention defined in claim 2, further characterized in that: the flexible driving connection comprises a universal joint; and the guide means movably carrying the second shaft on the supporting structure comprises a bearing for the first end of the second shaft and a slide carrying the bearing and mounted on the supporting structure.

5. The invention defined in claim 4, further characterized in that: the control means comprises biasing means connected between the supporting structure and the slide and effective to bias the slide in one direction relative to the first shaft, and force-exerting means connected to the slide and effective to move the slide in the opposite direction against the action of the biasing means.

RALPH L. ANDERSON.

References Cited in the file of this patent

UNITED STATES PATENTS

| Number | Name | Date |
|---|---|---|
| 2,022,166 | Welty | Nov. 26, 1935 |
| 2,047,362 | Dunford | July 14, 1936 |
| 2,224,576 | Mutschler | Dec. 10, 1940 |
| 2,560,991 | Schuricht | July 17, 1951 |